(12) United States Patent
Sitaraman et al.

(10) Patent No.: US 6,442,165 B1
(45) Date of Patent: Aug. 27, 2002

(54) LOAD BALANCING BETWEEN SERVICE COMPONENT INSTANCES

(75) Inventors: Aravind Sitaraman, Santa Clara; Shuxian Lou, San Jose; Shujin Zhang, San Mateo; Sampath Kumar Sthothra Bhasham, Santa Clara, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/205,004

(22) Filed: Dec. 2, 1998

(51) Int. Cl.[7] .............................................. H04L 12/28
(52) U.S. Cl. .................................... 370/395.4; 370/412
(58) Field of Search ................................ 370/255, 338, 370/413, 229, 389, 401, 414, 402, 415, 259, 416, 524, 418, 231, 395.4, 237, 395.41, 412, 468, 230, 352, 395.21; 709/713, 200, 201, 202, 100, 101, 102, 103, 105

(56) References Cited

U.S. PATENT DOCUMENTS

| | | | |
|---|---|---|---|
| 4,769,810 A | 9/1988 | Eckberg, Jr. et al. | 370/60 |
| 4,769,811 A | 9/1988 | Eckberg, Jr. et al. | 370/60 |
| 4,933,937 A | 6/1990 | Konishi | 370/85.13 |
| 5,014,265 A | 5/1991 | Hahne et al. | 370/60 |
| 5,224,099 A | 6/1993 | Corbalis et al. | 370/94.2 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,367,54 A | 11/1994 | Cidon et al. | 370/54 |
| 5,408,472 A | 4/1995 | Hluchyj et al. | 370/94.1 |
| 5,423,002 A | 6/1995 | Hart | 395/200 |
| 5,430,715 A | 7/1995 | Corbalis et al. | 370/54 |
| 5,502,725 A | 3/1996 | Pohjakallio | 370/94.1 |
| 5,509,006 A | 4/1996 | Wilford et al. | 370/60 |
| 5,513,172 A | 4/1996 | Shikama et al. | 370/13 |
| 5,541,957 A | 7/1996 | Lau | 375/258 |
| 5,561,663 A | 10/1996 | Klausmeier | 370/17 |
| 5,570,360 A | 10/1996 | Klausmeier et al. | 370/60 |
| 5,570,361 A | 10/1996 | Norizuki et al. | 370/60.1 |
| 5,592,470 A | 1/1997 | Rudrapatna et al. | 370/320 |
| 5,594,727 A | 1/1997 | Kolbenson et al. | 370/442 |
| 5,594,732 A | 1/1997 | Bell et al. | 370/401 |
| 5,610,910 A | 3/1997 | Focsaneanu et al. | 370/351 |
| 5,666,353 A | 9/1997 | Klausmeier et al. | 370/230 |
| 5,699,521 A | 12/1997 | Iizuka et al. | 395/200.15 |
| 5,717,604 A | 2/1998 | Wiggins | 364/514 |
| 5,734,654 A | 3/1998 | Shirai et al. | 370/396 |
| 5,768,521 A | 6/1998 | Dedrick | 395/200.54 |
| 5,799,040 A | 8/1998 | Lau | 375/258 |
| 5,835,494 A | 11/1998 | Hughes et al. | 370/397 |
| 5,835,727 A * | 11/1998 | Wong et al. | 709/238 |
| 5,926,458 A | 7/1999 | Yin | 370/230 |
| 5,953,336 A | 9/1999 | Moore et al. | 370/395 |
| 6,018,770 A | 1/2000 | Little et al. | 709/223 |
| 6,026,440 A | 2/2000 | Schrader et al. | 709/224 |
| 6,119,160 A * | 9/2000 | Zhang et al. | 709/224 |
| 6,128,279 A * | 10/2000 | O'Neil et al. | 370/229 |
| 6,198,479 B1 * | 3/2001 | Humpleman et al. | 345/329 |

* cited by examiner

Primary Examiner—David Vincent
Assistant Examiner—Alexander O. Boakye
(74) Attorney, Agent, or Firm—Thelen Reid & Priest LLP (57) ABSTRACT

Service requests, which are used to properly process a network access request received from a client, are processed by routing the service requests between at least two service component instances according to a load balancing algorithm. Load balancing includes: calculating a first ticket amount and a second ticket amount; assigning the first ticket amount to a first instance and the second ticket amount to a second instance; using a selection scheme to select an instance having a ticket amount greater than a threshold amount to process a service request; decrementing the ticket amount corresponding to the instance selected; and scheduling the instance selected to receive a service request. The present invention may further include distinguishing between operable and inoperable instances, providing ticket amounts that are not based on performance ratings to inoperable instances, and providing ticket amounts that are based on performance ratings to operable instances.

33 Claims, 6 Drawing Sheets

LOAD BALANCING BETWEEN SERVICE COMPONENT INSTANCES

BACKGROUND OF THE INVENTION

1. Field of the Invention

The present invention relates to load balancing. More particularly, the present invention relates to load balancing service requests between at least two service component instances associated with a network access point.

2. The Background

The proliferation of fixed price unlimited network access is one manifestation of the increasing demand for inexpensive network access to a resource rich communications system, such as the Internet. To keep their network access operations profitable, if not soluble, network access providers, such as ISPs ("Internet Service Providers") must balance the needs of their subscribers with the cost of providing network access capacity that is sufficient to support those needs. However, sizing network access capacity is difficult to do because the demand for network access may vary continuously.

Figure 1:
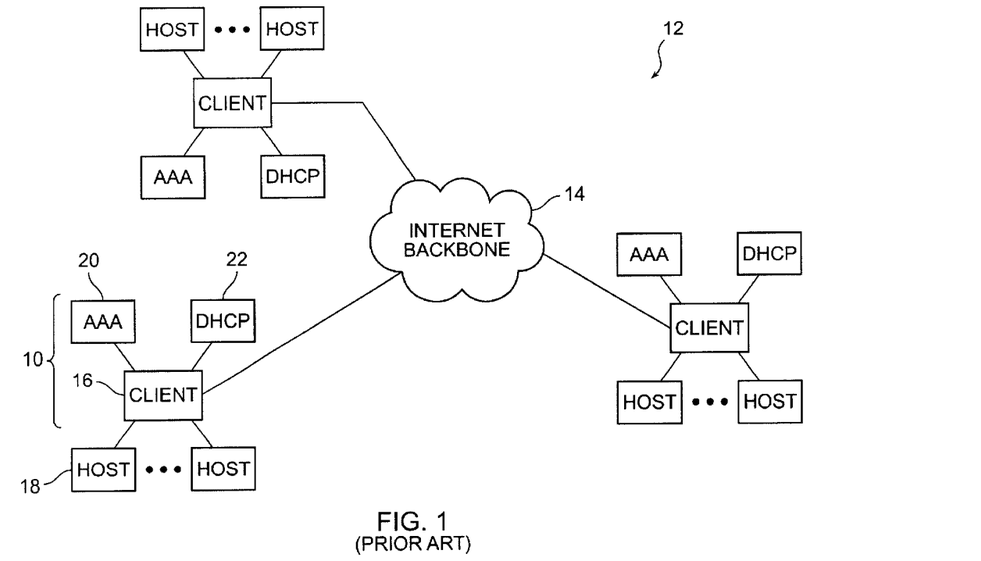
FIG. 1 is a schematic block diagram of an access point which has a network access request capacity based on the ability of the service components associated with the access point to support that network access request capacity.

For example, FIG. 1 is a block diagram of one possible implementation of an access point that has a network access request capacity dependent on the service components used by the access point. Access point 10 is shown in relation to a communications system 12 that uses a communications backbone 14, such as the Internet. Access point 10 includes a client 16 and the necessary network connections to service components that provide the services required to properly process a network access request received by client 16 from a host 18.

When host 18 sends a network access request to access point 10, client 16 receives the request and processes the request according to the access methodology used by host 18. For example, if host 18 relies on a dial-up methodology, client 16 responds to the network access request by requesting, among other things, the following services from its service components. First, client 16 will send a service request to a service component that provides authentication and authorization services, such as an AAA (Authentication, Authorization, and Accounting) server 20. AAA server 20 will respond by determining whether the network access request received is authorized and respond with a reply, which indicates whether the request is authorized or unauthorized. Second, if client 16 receives a reply indicating that the network access request is authorized, client 16 then sends a request for an address to another service component, such as a DHCP (dynamic host configuration protocol) server 22. Those of ordinary skill in the art will recognize that the address provided by a DHCP server 22 will be in the format of an IP address. Upon receiving the address, client 16 sends a reply packet having the address to host 18, enabling host 18 to proceed within the log-on process using the address contained within the packet.

From the above example, providing the necessary processing required to support a network access request under a particular access methodology depends on the performance of the service components used. Thus, one solution is to size service components, i.e., build or provide service components that have high transaction rates, so as to maintain network access request processing levels at or above the level required by hosts seeking network access even during peak times. This approach is expensive because it provides a static solution to a problem that is dynamic in nature. By preparing for the worst case scenario, the solution builds in inefficiencies during off-peak periods and thus, results in an "over-built" and hence, more expensive than necessary network access point.

Building network access points which are less over-built, such as network access points that have sufficient resources for the average demand over a given period, may also be implemented but such an approach does not adequately provide for peak periods (such as the situation described above) or for periods which require less than the average number of resources.

Accordingly, a need exists for an apparatus which may be used in conjunction with components within a network access point to load balance the processing of network access requests using the services of at least two instances of a particular service component type, such as an AAA server.

Further, a need exists for an apparatus that may be used in conjunction with components within a network access point to load balance the processing of network access requests according to the measured performance of the instances used.

Further, a need exists for an apparatus that may be used in conjunction with components within a network access point to load balance the processing of network access requests between or among instances of a particular service component type without the need for receiving feedback from each instance used.

Furthermore, a need exists for an apparatus which may be used in conjunction with components within a network access point to load balance the processing of network access requests between or among instances while detecting inoperative and/or restarted instances.

SUMMARY OF THE INVENTION

Service requests, which are used to properly process a network access request received from a client, are processed by routing the service requests between at least two service component instances according to a load balancing algorithm. Load balancing includes: calculating a first ticket amount and a second ticket amount; assigning the first ticket amount to a first instance and the second ticket amount to a second instance; using a selection scheme to select an instance having a ticket amount greater than a threshold amount to process a service request; decrementing the ticket amount corresponding to the instance selected; and scheduling the instance selected to receive a service request.

The present invention may further include distinguishing between operable and inoperable instances during load balancing, providing ticket amounts that are not based on performance ratings to inoperable instances, and providing ticket amounts that are based on performance ratings to operable instances. For example, inoperable instances may each receive a ticket amount that is one increment above the threshold amount and operable instances may each receive a ticket amount that is based on the performance rating of each operable instance.

DETAILED DESCRIPTION OF THE PREFERRED EMBODIMENTS

In the following description, preferred embodiments of the invention are described with regard to preferred components and process steps. Those skilled in the art would recognize, after perusal of this application, that embodiments of the invention may be implemented using at least one general purpose computer operating under program control, and that modification of the general purpose computer to implement the components and process steps described would not require undue invention.

In accordance with a presently preferred embodiment of the present invention, the components and process steps may be implemented using C++ programs running on an Enterprise 2000 server™ running SunSolaris™ as its operating system. The Enterprise 2000 server™ and SunSolaris™ operating system are available from Sun MicroSystems, Inc. of Mountain View, Calif. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA or ASIC technology, and the like, may also be used without departing from the scope and spirit of the inventive concepts disclosed herewith.

Figure 2:
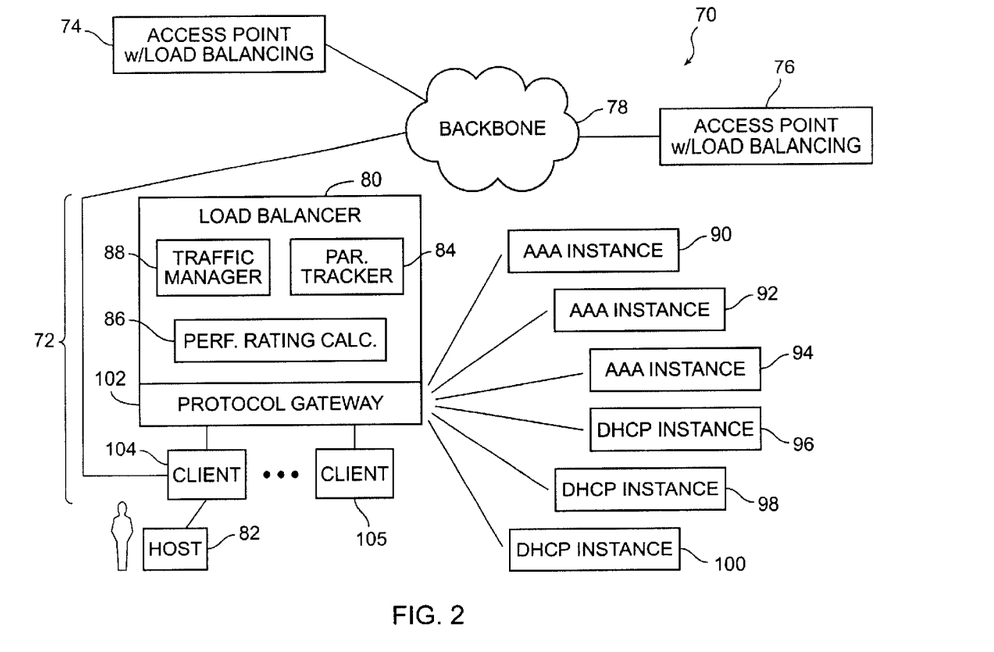
FIG. 2 is a block diagram of a communications system having at least one network access point having a load balancing interface for load balancing the processing of service requests between at least two service component instances in accordance with a presently preferred embodiment of the present invention.

FIG. 2 is a block diagram of a communications system having at least one network access point having a load balancing interface for load balancing the processing of service requests between at least two service component instances in accordance with a presently preferred embodiment of the present invention.

Communications system 70 is shown having access points 72, 74, and 76, and a network backbone 78. The number of network access points used in communications system 10 is not intended to be limiting in any way. Those of ordinary skill in the art will readily recognize that more or less than the number of access points shown may be implemented without departing from the scope and spirit of the disclosure. Network backbone 78 is a communication medium along which information may be transmitted and/or received between or among access points directly or ultimately coupled to backbone 78, such as access point 72 and 76. Network backbone 78 is implemented using a wide area network, such as the Internet. The use of the Internet is not intended to be limiting in any way. Other types (or any number) of networks may be used as long as the network chosen supports the protocols, such as TCP/IP based protocols or equivalents, used by devices which connect to the backbone.

Each access point shown in FIG. 2, such as access point 72, is associated with at least one client, a load balancer, and at least two instances for each service component selected for processing service requests. The service requests are generated in response to a network access request sent by a host 82. The load balancer 80 decides which of the service component instances will receive a service request. Load balancer 80 routes service requests between service component instances according to a load-balancing algorithm described below. Load balancer 80 includes a parameter tracker 84; a performance rating calculator 86 responsive to said at least one parameter tracked by parameter tracker 84; and a traffic manager 88 responsive to at least one performance rating produced by performance rating calculator 86.

A service component is any component that provides a service required to properly process a network access request according to a particular access method. For example, a network access request based on a dial-up access method requires an authentication and authorization service and an IP address allocation service. Such services are readily obtainable from an AAA service component, such as an AAA server, and a DHCP service component, such as a DHTP server, respectively. Such servers are well known to those of ordinary skill in the art. FIG. 2 shows three instances 90, 92, and 94 of an AAA service component; and three instances 96, 98, and 100 of a DHCP service component although the number of service component instances for a particular service component type is not intended to be limiting. More or less than the number of instances shown may be used with the present invention without departing from the inventive concepts disclosed. Load balancing is between or among similar instances, i.e., instances of a particular service component type. Thus, load balancing for the instances shown in FIG. 2 is performed between instances 90, 92, and 94 because they are associated with the same or similar service component type, which in this case, is an AAA service component. Similarly, load balancing may also be performed between instances 96, 98, and 100 with each instance associated with the DHCP service component type.

Load balancing is not performed between or among dissimilar instances, such as load balancing service requests among all six the instances shown in FIG. 2. An instance belongs to or is associated with a service component type if the instance can process the same type of service request defined for the service component type and does so using the same or a compatible application protocol used by the service component type. For example, instances that can process an authentication and authorization service request based on the RADIUS protocol can be said to belong to AAA service component type. These same instances, however, cannot be said to belong to a DHCP service component type unless they can also provide DHCP services, such as providing an IP address, using the DHCP protocol.

Moreover, instances which provide the same service using a different application protocol are also defined as dissimilar instances even though the two instances can process the same service request. For example, two instances that provide AAA services but do so using RADIUS and TACAS+, respectively, are defined as dissimilar instances and do not qualify as a group to which service requests may be scheduled for load balancing.

FIG. 2 also shows a protocol interface 102 associated with access point 72, and coupled to at least one client, such as client 104, load balancer 80, and the service component instances required to support the clients associated with access point 72. Protocol interface 102 enables access point 72 to support multiple clients, which may rely on different access methods. Upon receipt of a network access request from a client, such as client 104, protocol interface 102 determines the proper access methodology required to properly process the network access request. Since client 104 relies on a dial-up access methodology, the protocol interface processes the network access request according to the dial-up access methodology. Supporting a network access request based on a dial-up access methodology requires obtaining AAA and DHCP services. These services are typically provided by an AAA service component and a DHCP service component, respectively, requiring protocol interface 102 to support the application protocols required by the service components, such as RADIUS and DHCP, in order to properly obtain the services required to process the network access request.

Protocol interface 102 is responsive to routing directions from traffic manager 88, enabling protocol interface 102 to distribute service requests according to the load balancing algorithm performed by load balancer 80 if there is more than one service component instance of the same or similar service component type.

Protocol interface 102 is not intended to limit the load balancing features disclosed in any way. An implementation other than protocol interface 102 ("requesting element") may be used as long as the requesting element is capable of communicating with a service component according to the application protocol used by the service component and is responsive to routing directions from traffic manager 88. For example, an AAA service component instance may use RADIUS, TACAS+, or Diameter as its application protocol, requiring the requesting element to be responsive to the protocol used.

Protocol interface 102 is used in the preferred implementation because it supports a variety of application protocols, including the RADIUS and DHCP protocols, enabling it to communicate with the applicable service components required to process the service requests associated with network access requests based on different access methods. However, those of ordinary skill in the art will readily recognize that other types of requesting elements may be used as long as the requesting element selected supports the functions disclosed. Protocol interface 102 and load balancer 80 may be implemented using the User Control Point (UCP) product, from Cisco Systems, Inc.

Client 104 is an interface responsive to a host machine that uses a particular type of access method. For example, client 104 may be implemented using a network access server enabling a network access request to be received from a host that uses a dial-up access method, such as host 82. The type and number of clients in each access point is not intended in any way to be limiting. Those of ordinary skill in the art will readily recognize that additional clients may be supported within an access point, such as a client based on a digital subscriber line method (hereinafter referred to as xDSL), Voice Over IP, and or equivalent. Those of ordinary skill in the art will recognize that digital subscriber line-based clients would include RADSL, VDSL, HDSL, and SDSL clients.

The ability of clients to communicate with a requesting element, such as protocol interface 102, would be readily apparent to those of ordinary skill in the art. For example, client 104 when implemented using a network access server relies on the RADIUS protocol to communicate with service components. Similarly, a client 105, when implemented using a DSL-based interface, may also use the RADIUS protocol. Since the RADIUS protocol is known to those of ordinary skill art, communication between such clients (and their equivalents) and protocol interface 102 may be provided without undue invention and thus is not discussed herewith to avoid over-complicating the present discussion. In addition, the use of the RADIUS protocol as the application protocol between clients and protocol interface 102 is not intended to be limiting. Other types of protocols may be used that are known in the art, such as TACAS+, DHCP, and Diameter. The use of a particular protocol is not intended to limit the present invention in any way and does not materially affect the load balancing algorithm used by load balancer 80 as described below.

Figure 3A:
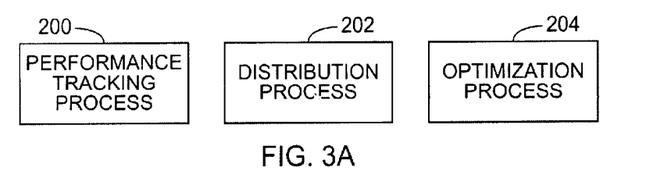
FIG. 3A is a process flow showing the load balancing of service requests between at least two instances associated with a similar service component type in accordance with a presently preferred embodiment of the present invention.

FIG. 3A is a process flow showing the load balancing of service requests between at least two instances associated with a similar service component type in accordance with a presently preferred embodiment of the present invention.

Three processes are shown: a performance tracking process 200, a distribution process 202, and an optimization process 204. Each of the processes operates in parallel with each of the other processes and maybe implemented as separate threads in a multi-tasking environment.

Performance tracking process 200 maintains a history of at least one performance parameter for each instance selected for load balancing. It provides the tracking of the necessary performance parameters required by distribution process 202 and optimization process 204.

Figure 3B:
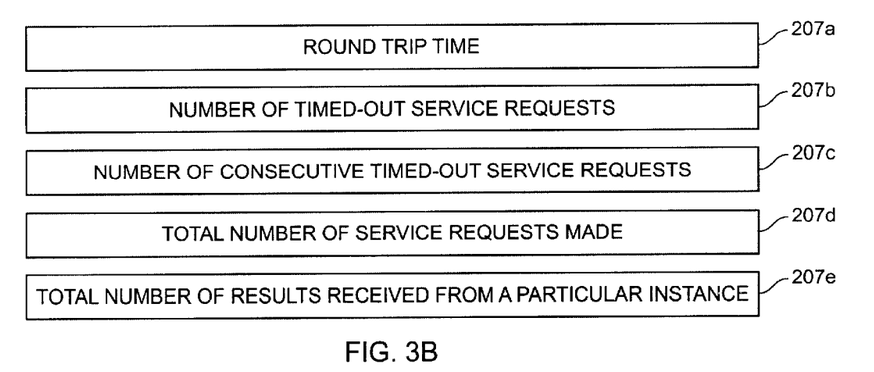
FIG. 3B is a block diagram showing the performance parameters tracked for each instance selected for load balancing in accordance with a presently preferred embodiment of the present invention.

As shown in FIG. 3B and in accordance with a presently preferred embodiment of the present invention, the performance parameters tracked for each instance selected for load balancing, such as the instances selected in reference number 206 below, include:

(1) a round trip time 207a defining a period of time that elapses between the time a service request is sent to an instance and the time a result to the service request is provided;

(2) the number of service requests that do not receive a result within an allotted time, hereinafter referred to as the number of timed-out service requests 207b;

(3) the number of consecutive timed-out service requests 207c;

(4) the total number of service requests made 207d; and (5) the total number of results received from a particular instance 207e.

Preferably, the round trip time is measured in milliseconds, while the number of timed-out service requests, consecutive timed-out service requests, the total number of service requests made, and the total number of results received are positive integer values.

Figure 4:
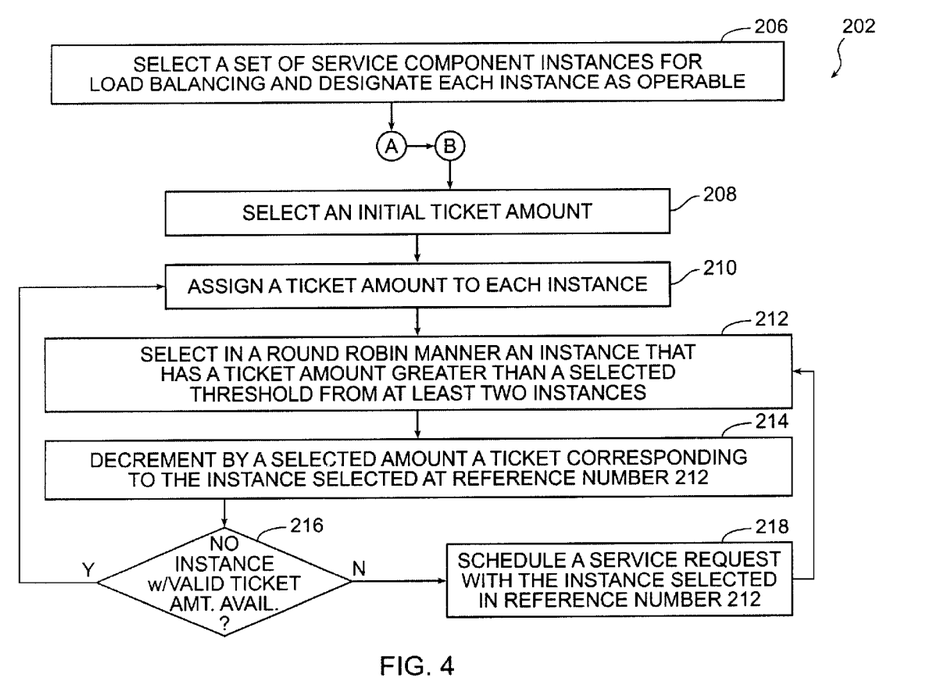
FIG. 4 is a flow diagram illustrating the distribution of service requests for each instance selected for load balancing in accordance with a presently preferred embodiment of the present invention.

FIG. 4 is a flow diagram illustrating the distribution of service requests for each instance selected for load balancing in accordance with a presently preferred embodiment of the present invention.

Distribution process 202 includes the following acts.

At reference number 206, a set of service component instances are selected for load balancing and are designated as operable. The instances selected for load balancing must be of the same service component type. For example, if a service request is received for a network access request that requires authentication and authorization, the instances selected for load balancing is limited to servers that provide such services; such as AAA servers 90, 92, and 94 (see FIG. 2). If the service request is for an address, such as an IP address, then the instances selected for load balancing would be limited to servers that provide an IP address (or equivalent address), such as DHCP servers 96, 98, and 100. The number of service components selected for load balancing is not intended to be limited to a specific amount although the number selected must be equal to or greater than two since load balancing inherently requires at least two instances or items.

At reference number 208, through nodes A and B, an initial ticket amount is selected. The initial ticket amount chosen may be any arbitrary number although in the presently preferred embodiment of the present invention the initial ticket amount is set to a value of 100. For example, if the group of service component instances of the same service component type selected includes AAA servers 90, 92, and 94, each of the servers will be assigned an initial ticket amount of 100. In accordance with a presently preferred embodiment of the present invention, an operator or equivalent personnel performs the acts at reference numbers 206 and 208 although this approach is not intended in any way to be limiting. For instance, the act at reference number 208 may be performed by a program or equivalent function.

At reference 210, a ticket amount is assigned to each instance within the group of service component instances selected at reference 206. At initialization, this ticket amount is equal to the initial ticket amount selected at reference number 208. However, this ticket amount may be subsequently set to equal a ticket amount calculated at reference number 266 should optimization process 204 take place, as described below.

At reference number 212, one of the instances within the set of service component instances chosen for load balancing is selected to receive a service request. The instance is selected in a round-robin manner from a group of instances that have ticket amounts greater than a selected threshold at the time of selection. Using a round-robin selection scheme is not intended to be limiting—any other selection scheme may be used. The selected threshold amount may be any amount that is less than the initial ticket amount chosen in step 208 although preferably the selected threshold amount is an integer zero ("0").

Under a round-robin selection scheme, each instance within the group of instances must be selected once before any instance may be selected again. Thus, once an instance has been selected, it cannot be selected again until all of the other instances have been selected. After all of the instances have been selected once, the round-robin selection process then begins anew, creating a new selection round. At the start of each new selection round, all eligible instances are again available for selection, regardless of whether the instances were previously selected in the prior selection round. The criteria used to select the first eligible instance at the start of the instance selection process are not intended to be limiting in any way. Any criteria may be used.

For example, if AAA server instances 90, 92, 94 have been selected for load balancing and each have a ticket amount greater than the selected threshold amount, each of the instances are eligible for round-robin selection. A server instance is selected, such as server instance 90, and the process flow proceeds to reference number 214. If the process flow returns to reference number 212, another eligible instance is selected from the group of eligible instances that has not been selected in the current selection round, such as instance 92. The process flow then proceeds to reference number 214. If the process flow returns to reference number 212, another eligible instance is selected from the group of eligible instances that has not been selected for the current selection round, such as instance 94. The selection of the last eligible but previously unselected instance within the selection round resets the round-robin algorithm. Hence, if the process flow returns to step 212 again, instance 90 is selected under the round-robin scheme, if eligible.

An instance is not eligible for selection if it has a current ticket amount that is less than the selected threshold amount. Using the same example immediately above, if at reference 212, instance 90 has a current ticket amount that is less than or equal to the threshold amount, and instances 92 and 94 have current ticket amounts that are greater than the threshold amount, instances 92 and 94 are the only instances eligible for selection. Similarly, if instance 94 is the only instance remaining that has a current ticket amount greater than the threshold amount, it is the only instance available for selection. As discussed further below, instance 94 will keep receiving scheduled service requests until its ticket amount is decremented to an amount that is equal to or less than the threshold amount. Once this occurs, the process flow proceeds to reference number 210 via reference number 216.

At reference number 214, the ticket amount corresponding to the instance selected at reference number 212 is decreased according to a selected amount, resulting in a current ticket amount. In accordance with a presently preferred embodiment of the present invention, the selected amount is in integer units of 1 although any amount may be used.

At reference number 216, if the current ticket amount at reference number 214 is equal to or less than the selected threshold amount and if there is no instance available (within the set of instances selected for load balancing and having the same service component type) that has a current ticket amount greater than the selected threshold amount, processing returns to reference number 210. Otherwise, processing proceeds to reference number 218.

At reference number 218, a service request is scheduled for transmission to the instance selected in step 212. In accordance with a presently preferred embodiment of the present invention, load balancer 80 provides the scheduling of service requests although this is not intended to be in any way limiting. Other solutions for scheduling service requests may be used without departing from the scope and spirit of the disclosure. For instance, buffering may be provided using a FIFO buffer or equivalent queue.

The process flow returns to reference number 212.

Figure 5:
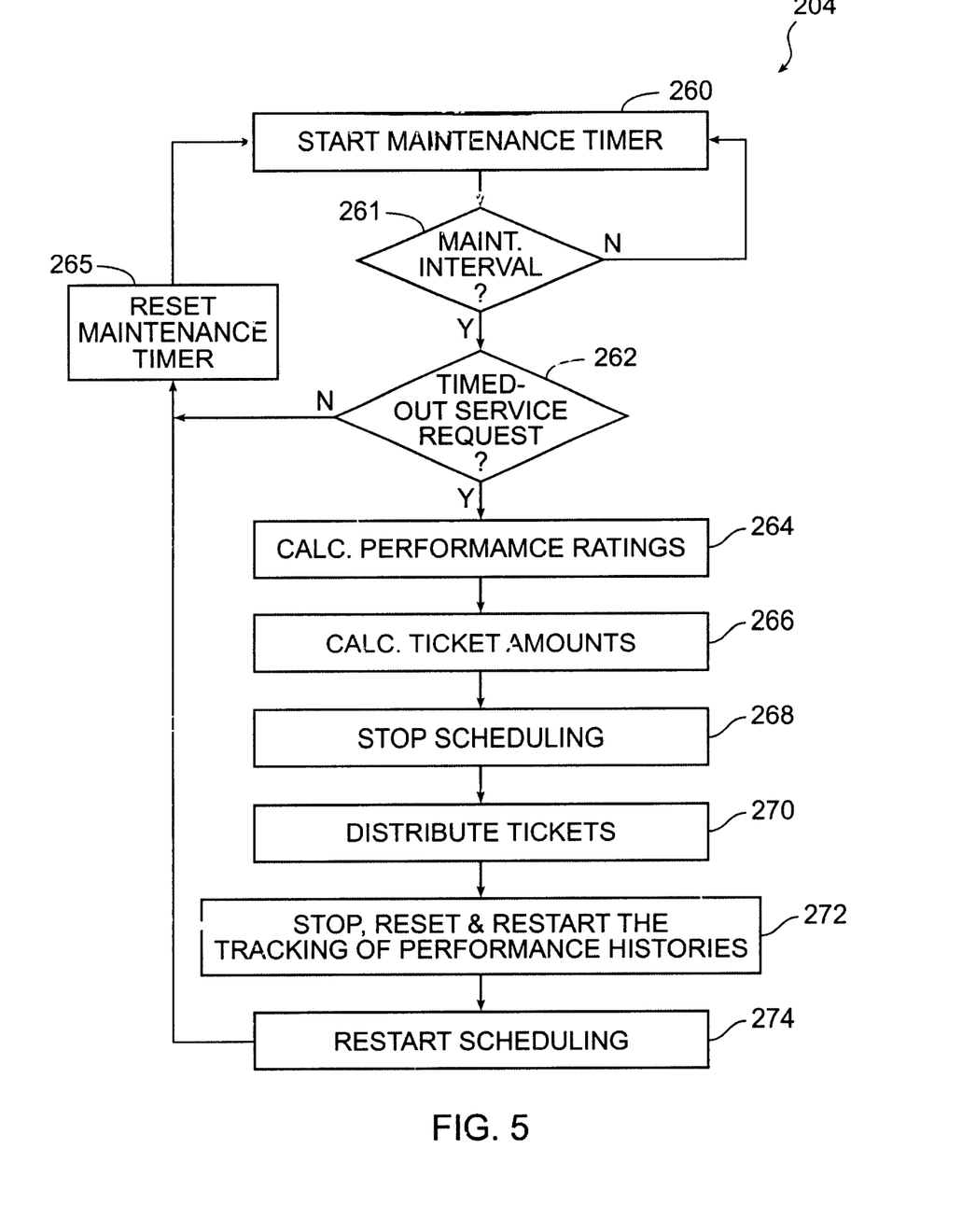
FIG. 5 is a process flow illustrating the optimization of the distribution of service requests for each instance selected for load balancing in accordance with a presently preferred embodiment of the present invention.

FIG. 5 is a process flow illustrating the optimization of the distribution of service requests for each instance selected for load balancing in accordance with a presently preferred embodiment of the present invention.

Optimization process 204 includes the following acts.

At reference number 260, a maintenance timer is started.

At reference number 261, if the maintenance timer equals or exceeds a selected maintenance interval, the process flow proceeds to reference number 262. Otherwise, the maintenance timer continues operating. The use of a maintenance interval is not intended to be limiting. Other types of events may be used without departing from the scope and spirit of the disclosure. For example, the selected event may be triggered when a selected performance parameter crosses a threshold value, such as when the number of consecutively timed-out service requests exceeds a predetermined value, causing an interrupt to occur and triggering the process to proceed to step 264.

At reference 262, if there is at least one timed-out service request that has been scheduled for processing by an instance selected for load balancing, the process flow proceeds to 264. Otherwise, the maintenance timer is reset (see reference number 265) and the process flow returns to reference 260.

At reference number 264, a performance rating is calculated for each instance within the group of instances selected for load balancing, such as the instances selected for load balancing at reference number 206.

At reference number 266, a ticket amount is calculated for each instance within the group of instances selected for load balancing, such as the instances selected for load balancing at reference number 206.

At reference number 268, the scheduling of service requests is stopped (see distribution process 202, at reference number 218 in FIG. 4).

At reference number 270, the ticket amounts, which were calculated at reference number 266, are distributed to their respective instances.

At reference number 272, the performance histories tracked for each instance selected for load balancing are stopped, reset, and restarted (see performance tracking process 200 in FIG. 3A).

At reference number 274, scheduling of service requests is restarted, and the optimization process flow returns to reference number 265.

Figure 6:
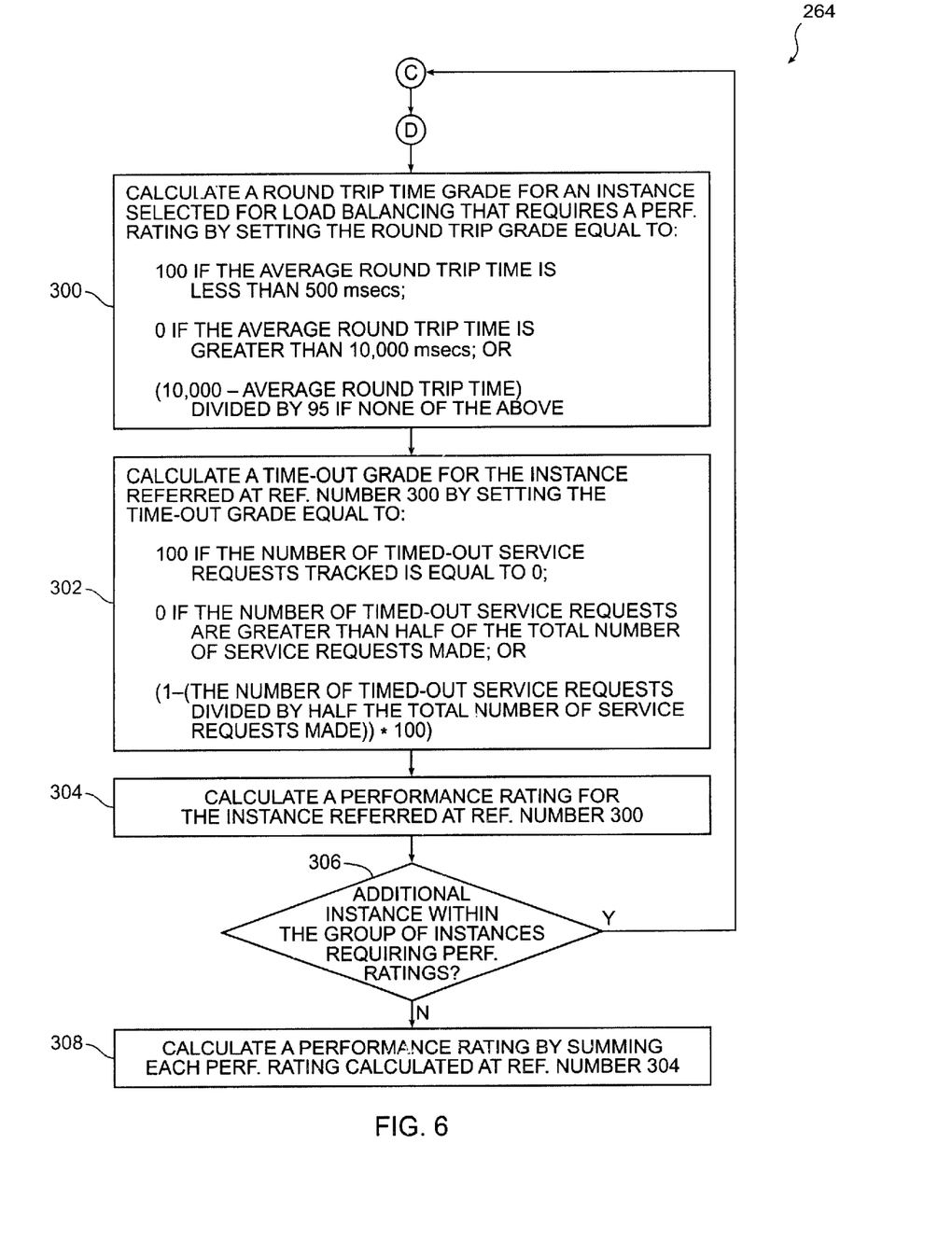
FIG. 6 is a process flow showing the calculation of a performance rating for each instance within the group of instances selected for load balancing in accordance with a presently preferred embodiment of the present invention.

FIG. 6 is a process flow showing the calculation of a performance rating for each instance within the group of instances selected for load balancing in accordance with a presently preferred embodiment of the present invention.

At reference number 300, through nodes C and D, for an instance within the group of instances selected for load balancing, a round trip time grade of between 0 and 100 is calculated by averaging the round trip times tracked and assigning a value based on the following algorithm: if the average round trip time is less than 500 then the round trip time grade is equal to 100; otherwise, if the average round trip time is greater than 10,000 then the grade is equal to zero (0). If none of the above, then the round trip time grade is equal to (10,000−average round trip time)/95.

At reference number 302, for the instance referred to at reference number 300, a timed-out grade of between 0 and 100 is calculated by assigning a value based on the following algorithm: If the number of timed-out service requests tracked is equal to zero then the timed-out grade is equal to 100; otherwise if the number of timed-out service requests are greater than half the total number of service requests made then the timed-out grade is equal to zero (0). If none of the above, then the timed-out grade is equal to (1−(the number of timed-out service requests divided by half the total number of service requests made))*100.

At reference number 304, a performance rating is then calculated for the instance referred to at reference numbers 300 and 302 by averaging the round trip time grade and the timed-out grade, i.e., ((round trip time grade+timed-out grade)/2).

At reference number 306, if an additional instance within the group of instances selected for load balancing requires a performance rating, then the process flow proceeds back to reference number 300 via node C. A performance rating is then calculated for each instance referred to at reference number 300.

If at reference number 306, no additional instances within the group of instances selected for load balancing requires a performance rating, the process flow proceeds to reference number 308.

At reference number 308, a total performance value is calculated by summing each performance rating calculated for the instances referred to at reference number 306.

Figure 7:
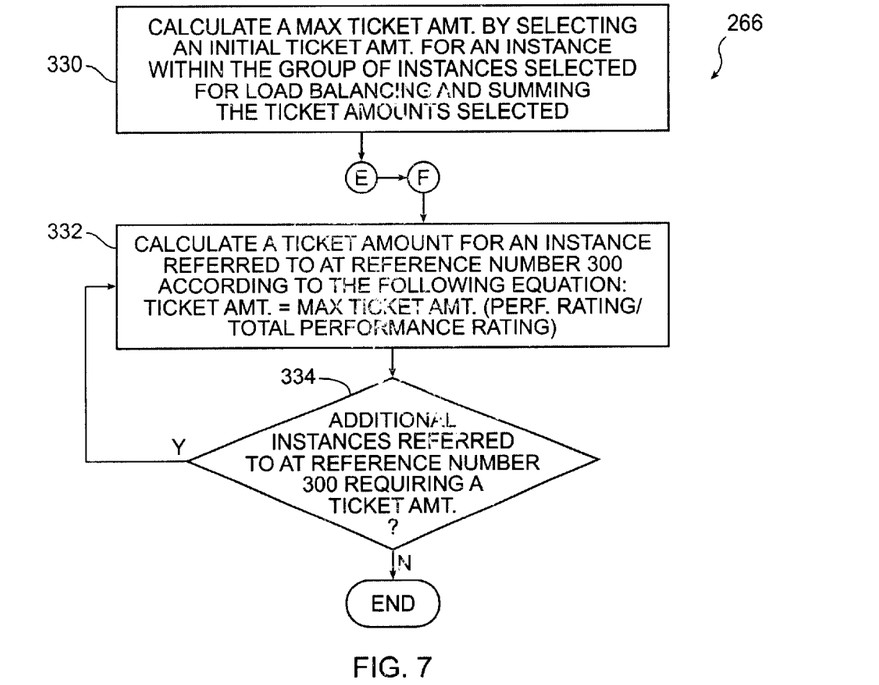
FIG. 7 is a process flow showing the calculation of a ticket amount for each instance in accordance with a presently preferred embodiment of the present invention.

FIG. 7 is a process flow showing the calculation of a ticket amount for each instance in accordance with a presently preferred embodiment of the present invention.

At reference number 330, a maximum ticket amount is calculated by summing the initial ticket amounts established at reference number 208. Summing the initial ticket amounts is not intended to be limiting in any way. Other methods may be used, such as multiplying the initial ticket amount by the number of similar instances that are selected for load balancing. The result is the same as the summing operation because the initial ticket amounts arbitrary selected for each instance are intended to be equal.

At reference number 332 through nodes E and F, a ticket amount is calculated for each instance according to the following equation, where "Max Ticket Amount" is equal to the maximum ticket amount calculated at reference number 330; "Performance Rating" is equal to the performance rating calculated for the instance at reference numbers 300 through 306; and "Total Performance Rating" is equal to the total performance rating calculated at reference number 308.

$$\text{Ticket Amount} = \text{Max Ticket Amount} \times \frac{\text{Performance Rating}}{\text{Total Performance Rating}}$$

At reference number 334, if additional instances referred to at reference number 300 require a ticket amount, the process flow proceeds to reference number 332. Otherwise, the process flow ends.

The present invention disclosed above may further include distinguishing between operable and inoperable instances during load balancing, as shown in FIGS. 8A–8D. This additional aspect of distinguishing between operable and inoperable instances is not intended to limit the present invention in any way, and may be used with any other type of load balancing embodiment that is within the scope and spirit of the disclosure.

Figure 8A:
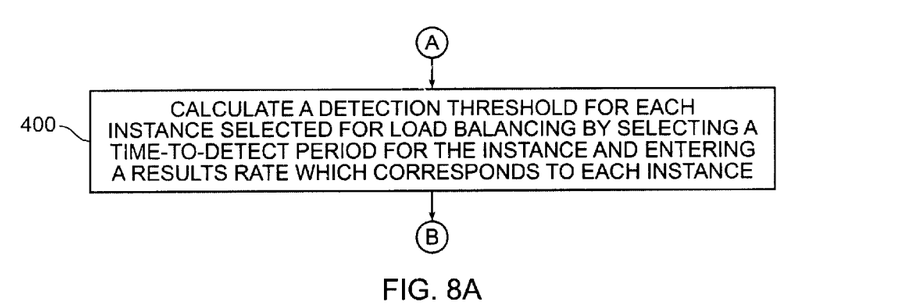
FIG. 8A is a process flow showing the calculation of a detection threshold in accordance with an additional aspect of the presently preferred embodiment of the present invention.

FIG. 8A is a process flow showing the calculation of a detection threshold in accordance with an additional aspect of the presently preferred embodiment of the present invention.

At reference number 400, a detection threshold is calculated for each instance selected for load balancing by selecting a time-to-detect period for the instance and entering a results rate which corresponds to each instance. The detection period and results rate are then multiplied, resulting in a detection threshold value.

The results rate entered at reference number 400 reflects the ability of a particular instance to provide the necessary result for a given service request. Hence, the results rate is instance dependent, among other things. The time-to-detect period must be greater than the time-out service request period established for the instance so that the time-to-detect period provides a sufficient time period for which an instance may reply to a service request. For example, a time-to-detect period of 10 seconds and a results rate of 3 results per second defines a detection threshold value of 30.

Step 400 may be performed starting at node A and exiting at node B, as seen in FIG. 4.

Figure 8B:
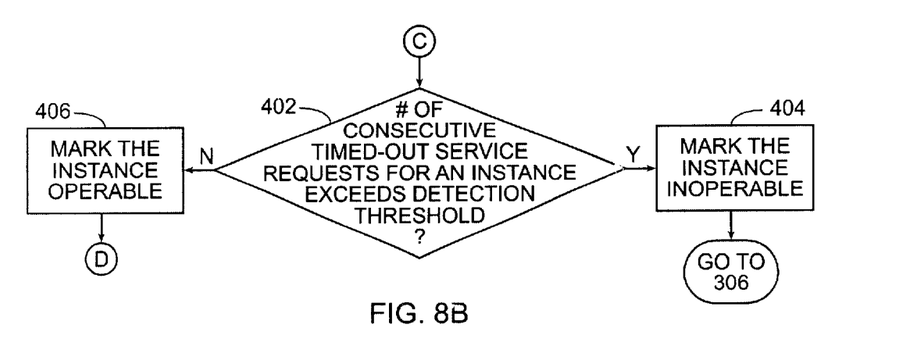
FIG. 8B is a process flow showing the detection of inoperable instances in accordance with an additional aspect of the presently preferred embodiment of the present invention.

FIG. 8B is a process flow showing the detection of inoperable instances in accordance with an additional aspect of the presently preferred embodiment of the present invention.

At reference number 402, through node C of FIG. 6, if the number of consecutive timed-out service requests for an instance requiring a performance rating, such as the instance selected at reference number 212 (see FIG. 4), exceeds the detection threshold calculated at reference number 400 (see FIG. 8A), the process proceeds to reference number 404.

At reference number 404, the instance is marked inoperable. The process flow then returns to step 306 of FIG. 6 through node D.

If at step 402, the number of consecutive timed-out service requests for the instance referred to at reference number 402 does not exceed the detection threshold calculated at reference number 400 the process flow proceeds to reference number 406.

At reference number 406, the instance is marked operable. The process flow then returns to step 300 of FIG. 6.

Figure 8C:
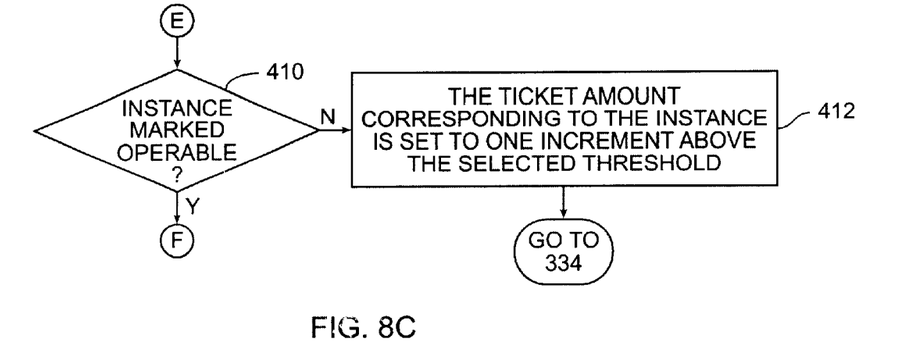
FIG. 8C is a process flow showing a process for handling instances marked inoperable in accordance with an additional aspect of the presently preferred embodiment of the present invention.

FIG. 8C is a process flow showing a process for handling instances marked inoperable in accordance with an additional aspect of the presently preferred embodiment of the present invention.

At reference number 410, through node E of FIG. 7, if the instance referred to at reference node 330 is marked inoperable, the process flow proceeds to reference number 412.

At reference number 412, the ticket amount corresponding to the instance is set to one increment above the selected threshold. The process flow then returns to reference number 334, which is shown in FIG. 7.

If at reference number 410, the instance referred to at reference number 330 is marked operable, the process flow proceeds to node F in FIG. 7.

Figure 8D:
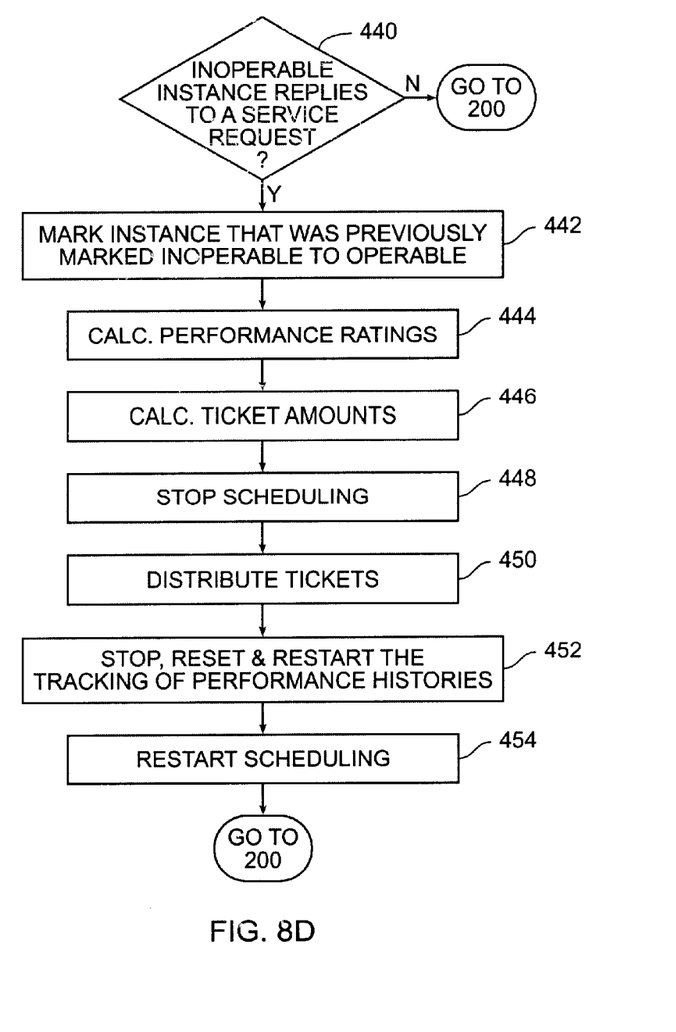
FIG. 8D is a process flow showing a process for transitioning previously inoperable instances into operable instances which are eligible for load balancing in accordance with an additional aspect of the presently preferred embodiment of the present invention.

FIG. 8D is a process flow showing a process for transitioning previously inoperable instances into operable instances which are eligible for load balancing in accordance with an additional aspect of the presently preferred embodiment of the present invention.

The following process flow is included as part of performance tracking process 200, as discussed above.

At reference number 440, at a selected time, such as after each set of performance parameters are received and tracked for a previously scheduled and transmitted service request, it is determined whether an inoperable instance provided a reply to the service request.

If so, the inoperable instance is transitioned into an operable instance eligible for load balancing by performing reference numbers 442 through 454.

At reference number 442, the inoperable instance is marked operable.

At reference number 444, a performance rating is calculated for each instance which is marked operable within the group of instances selected for load balancing.

At reference number 446, a ticket amount is calculated for each instance which is marked operable within the group of instances selected for load balancing, such as the instances selected for load balancing at reference number 206 in FIG. 4.

At reference number 448, the scheduling of service requests is stopped (see distribution process 202, at reference number 218 in FIG. 4).

At reference number 450, the ticket amounts, which were calculated at reference number 446, are distributed to their respective instances.

At reference number 452, the performance histories tracked for each instance selected for load balancing are stopped, reset, and restarted (see performance tracking process 200 in FIG. 3A).

At reference number 454, scheduling of service requests is re-started and the process flow returns to performance tracking process 200 in FIG. 3A.

If at 440, no inoperable servers provide a reply, then the process flow returns to performance tracking process 200 in FIG. 3A.

While embodiments and applications of this invention have been shown and described, it would be apparent to those skilled in the art that many more modifications than mentioned above are possible without departing from the inventive concepts disclosed. The invention, therefore, is not to be restricted except in the spirit of the appended claims.

We claim:

1. A method of load balancing the processing of service requests between at least two service component instances, the method comprising:

associating a first ticket amount with a first instance and a second ticket amount with a second instance;

scheduling said first instance to receive a service request and decrementing said first ticket amount, if said first ticket amount is greater than a threshold amount and said first instance is selectable from the at least two service components instances under a round-robin selection scheme, or if said first instance is the only instance within the at least two instances having a ticket amount greater than said threshold amount; and scheduling said second instance to receive said service request and decrementing said second ticket amount, if said second ticket amount is greater than said threshold amount and said second instance is selectable from the at least two service components instances under a round-robin selection scheme, or if said second instance is the only instance within the at least two instances having a ticket amount greater than said threshold amount.

2. The method of claim 1, further comprising:

calculating a first performance rating and a second performance rating; and calculating said first ticket amount using said first performance rating and said second ticket amount using said second performance rating.

3. The method of claim 2, wherein calculating said first and second performance rating is performed if a maintenance interval occurs.

4. The method of claim 2, wherein calculating said first and second performance rating is performed if a maintenance interval occurs and when at least one timed-out service request occurs.

5. The method of claim 2, wherein said step of calculating said first performance rating includes the steps of:
   calculating a round trip time grade;
   calculating a timed-out grade; and
   averaging said round trip time grade and said timed-out grade.

6. The method of claim 5, wherein said step of calculating said round trip time grade includes the steps of:
   finding an average round trip time by:
      using a history of at least one performance parameter;
      setting said round trip time grade equal to 100 if said average round trip time is less than 500 milliseconds;
      setting said round trip time grade equal to 0 if said average round trip time is greater than 10,000 milliseconds; and
      setting said round trip time grade equal to (10,000−said average round trip time) divided by 95.

7. The method of claim 5, wherein calculating said timed-out grade includes:
   setting said timed-out grade equal to 100 if a history of said timed-out grade includes no timed-out service requests;
   setting said timed-out grade equal to 0 if the number of timed-out grade in said history are greater than half the total number of service requests made; and
   setting said timed-out grade equal to (1−(the number of timed-out service requests divided by half the total number of service requests made))*100.

8. The method of claim 2, wherein calculating said first ticket amount using said first performance rating includes:
   selecting an initial ticket amount; and
   setting said first ticket amount equal to said initial ticket amount multiplied by said first performance rating divided by an average performance rating of the at least two instances.

9. The method of claim 2, wherein said step of calculating said second ticket amount using said second performance rating includes:
   selecting an initial ticket amount; and
   setting said second ticket amount equal to said initial ticket amount multiplied by said second performance rating divided by an average performance rating of the at least two instances.

10. The method of claim 2, wherein said step of calculating said first performance rating includes the steps of:
   selecting a total number of tickets which may be allocated between or among the at least two instances;
   calculating a first average round-trip value for said first instance and a second average round-trip value for said second instance;
   dividing said first average round-trip value by the sum of said first and second round-trip values so as to obtain a first result; and
   multiplying said total number of tickets by said first result.

11. The method of claim 1, further including keeping a history of at least one performance parameter for said first instance and said second instance, respectively.

12. The method of claim 11, wherein said at least one performance parameter includes a round-trip time parameter which is defined as a time period beginning from the time a service request is sent to a selected instance until the time a reply to said service request is received from said selected instance.

13. The method of claim 11, wherein said at least one performance parameter includes a reply-request ratio parameter which is defined by a number of replies to service requests performed by said selected instance divided by a number of service requests sent to said selected instance.

14. The method of claim 11, wherein said at least one performance parameter includes a time-out parameter which is defined by a number service requests which are sent to said selected instance and which are not replied to by said selected instance with a selected time-out period.

15. The method of claim 1, further comprising:
   calculating a third performance rating;
   calculating a third ticket amount using said third performance rating;
   associating said third ticket amount with a third instance; and
   scheduling said third instance to receive a service request, if said third ticket amount is greater than said threshold amount and said third instance is selectable from the at least two service components instances under a round-robin selection scheme, or if said third instance is the only instance within the at least two instances having a ticket amount greater than said threshold amount.

16. A load balancer for load balancing the processing of service requests between at least two instances, including a first instance and a second instance, the apparatus comprising:
   a parameter tracker for tracking at least one parameter;
   a performance rating calculator responsive to said at least one parameter by calculating a performance rating for each instance within the at least two instances, including a first performance rating for a first instance and a second performance rating for a second instance, and by assigning a first ticket amount to said first instance and a second ticket amount to said second instance, said first ticket amount and said second ticket amount based on said first performance rating and said second performance rating, respectively; and
   a traffic manager responsive to said first and second performance ratings by scheduling an instance, which has a ticket amount greater than said selected threshold, from the at least two instances to receive a service request, and by decrementing said ticket amount.

17. The apparatus of claim 16, wherein said performance rating calculator calculates said performance rating for said each instance when any one of said each instance fails to perform a selected number of services within a given period.

18. The apparatus of claim 16, wherein said traffic manager schedules said service requests in a round-robin manner.

19. The system of claim 16, further including a third instance.

20. A communications system having a network access point for processing network access requests, the system comprising:
   a first instance responsive to at least one service request;
   a second instance responsive to at least one service request;
   a first network access point coupled to said first instance and said second instance, said first network access point having:
      a parameter tracker for tracking at least one parameter;
      a performance rating calculator responsive to said at least one parameter by calculating a performance rating for each instance within the at least two instances, including a first performance rating for said first instance and a second performance rating for a second instance, and by assigning a first ticket amount to said first instance and a second ticket amount to said second instance, said first ticket amount and said second ticket amount based on said first performance rating and said second performance rating, respectively; and a traffic manager responsive to said first and second performance ratings by scheduling an instance, which has a ticket amount greater than said selected threshold, from the at least two instances to receive a service request and by decrementing a ticket amount associated with said instance.

21. The system of claim 20, wherein said performance rating calculator calculates when any one of said each instance fails to perform a selected number of services within a given period.

22. The system of claim 20, wherein said traffic manager schedules said service requests in a round-robin manner.

23. The system of claim 20, further including a second network access point.

24. A method of load balancing the processing of service requests between at least two service component instances, the method comprising:

designating as operable a first instance and a second instance;

distributing service requests to said first instance and said second instance;

distributing service requests to said first instance and said second instance using a load-balancing distribution scheme after the expiration of a maintenance interval and if at least one timed-out packet was generated during said maintenance interval, said load-balancing distribution scheme including:

calculating a first performance rating and a second performance rating;

calculating a first ticket amount using said first performance rating and assigning said first ticket amount to said first instance, if said first instance is operable;

calculating a second ticket amount using said second performance rating and assigning said second ticket amount to said second instance, if said second instance is operable;

scheduling said first instance to receive a service request and decrementing said first ticket amount, if said first ticket amount is greater than a threshold amount and said first instance is selectable from the at least two service components instances under a round-robin selection scheme, or is the only instance within the at least two instances having a ticket amount greater than said threshold amount; and scheduling said second instance to receive said service request and decrementing said second ticket amount, if said second ticket amount is greater than said threshold amount and said second instance is selectable from the at least two service components instances under a round-robin selection scheme, or is the only instance within the at least two instances having a ticket amount greater than said threshold amount.

25. The method of claim 24, further including selecting a detection threshold for said first instance and said second instance.

26. The method of claim 25, further including:

tracking a first number of consecutive timed-out service requests that occur for said first instance;

tracking a second number of consecutive timed-out service requests that occur for said second instance;

designating said first instance inoperable and assigning a first ticket amount having a value one increment above said threshold amount, if said first number of consecutive timed-out service requests exceeds said detection threshold; and designating said second instance inoperable and assigning a second ticket amount having a value one increment above said threshold amount, if said second number of consecutive timed-out service requests exceeds said detection threshold.

27. The method of claim 26, further including designating said first instance operable, calculating said first ticket amount using said first performance rating, and assigning said first ticket amount to said first instance, if said first instance replies to a service request.

28. The method of claim 26, further including designating said second instance operable, calculating said second ticket amount using said second performance rating, and assigning said second ticket amount to said second instance, if said second instance replies to a service request.

29. The method of claim 24, wherein said at least one timed-out packet is associated with said first instance.

30. The method of claim 24, wherein said at least one timed-out packet is associated with said second instance.

31. A method of load balancing the processing of service requests between at least two service component instances which have an initial ticket amount that is greater than a threshold amount, the method comprising:

scheduling service requests to each instance having a ticket amount greater than the threshold amount;

decrementing a ticket amount corresponding to one of said each instance each time said each instance is scheduled to receive a service request;

resetting said ticket amount of said each instance to the initial ticket amount each time a selected number of said each instance have a ticket amount that is equal to or less than the threshold ticket amount; and resetting said ticket amount of said each instance to a corresponding calculated ticket amount each time a selected interrupt expires.

32. The method of claim 31, further including:

calculating a performance rating for each instance; and calculating said calculated ticket amount using said performance rating that corresponds to said each instance.

33. The method of claim 31, further including resetting said ticket amount of said each instance to said calculated ticket amount each time said selected number of said each instance have a ticket amount that is equal to or less than the threshold ticket amount.

* * * * *